US007155335B2

(12) United States Patent
Rennels

(10) Patent No.: US 7,155,335 B2
(45) Date of Patent: Dec. 26, 2006

(54) SATELLITE RADIO REAL TIME TRAFFIC UPDATES

(75) Inventor: Ernest B. Rennels, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 378 days.

(21) Appl. No.: 10/635,299

(22) Filed: Aug. 6, 2003

(65) Prior Publication Data

US 2005/0033504 A1 Feb. 10, 2005

(51) Int. Cl.
*G06F 19/00* (2006.01)

(52) U.S. Cl. ........................ 701/117; 701/118; 701/119; 701/210; 701/213; 340/907

(58) Field of Classification Search ........ 701/200–215, 701/217, 220, 301, 117; 340/961, 988, 990; 342/36–37, 456, 457, 357.01, 357.02, 357.06, 342/357.08, 357.13; 252/301.34, 301.35
See application file for complete search history.

(56) References Cited

U.S. PATENT DOCUMENTS

| | | | | |
|---|---|---|---|---|
| 5,987,381 | A * | 11/1999 | Oshizawa | 701/209 |
| 6,034,626 | A | 3/2000 | Maekawa et al. | |
| 6,278,942 | B1 | 8/2001 | McDonough | |
| 6,374,177 | B1 * | 4/2002 | Lee et al. | 701/200 |
| 6,429,812 | B1 * | 8/2002 | Hoffberg | 342/357.1 |
| 6,487,496 | B1 | 11/2002 | Katayama et al. | |
| 6,529,804 | B1 * | 3/2003 | Draggon et al. | 701/1 |
| 6,640,185 | B1 * | 10/2003 | Yokota et al. | 701/208 |
| 6,725,022 | B1 * | 4/2004 | Clayton et al. | 455/154.1 |
| 6,728,531 | B1 * | 4/2004 | Lee et al. | 455/419 |
| 6,799,201 | B1 * | 9/2004 | Lee et al. | 709/217 |
| 6,804,602 | B1 * | 10/2004 | Impson et al. | 701/117 |
| 6,829,475 | B1 * | 12/2004 | Lee et al. | 455/419 |
| 6,989,765 | B1 * | 1/2006 | Gueziec | 340/905 |
| 6,993,615 | B1 * | 1/2006 | Falcon | 710/303 |
| 2002/0046084 | A1 * | 4/2002 | Steele et al. | 705/14 |
| 2003/0018427 | A1 * | 1/2003 | Yokota et al. | 701/208 |
| 2003/0187571 | A1 * | 10/2003 | Impson et al. | 701/117 |
| 2004/0204821 | A1 * | 10/2004 | Tu | 701/200 |
| 2004/0254723 | A1 * | 12/2004 | Tu | 701/209 |
| 2005/0172230 | A1 * | 8/2005 | Burk et al. | 715/716 |
| 2005/0192033 | A1 * | 9/2005 | Videtich | 455/456.6 |
| 2006/0023656 | A1 * | 2/2006 | Anglin, Jr. | 370/328 |
| 2006/0059535 | A1 * | 3/2006 | D'Avello | 725/139 |

OTHER PUBLICATIONS

The Daily Californian, Professor Hopes to Cure Bay Area Traffic Malady, 2001, Internet, p. 1-3.*

(Continued)

*Primary Examiner*—Thomas Black
*Assistant Examiner*—McDieunel Marc
(74) *Attorney, Agent, or Firm*—Anthony Luke Simon

(57) ABSTRACT

A system and method for providing real-time traffic updates to a mobile vehicle communication device is disclosed. Producing traffic incident region coordinate data, communicating the traffic incident region coordinate data to a mobile vehicle communication device, and determining when a traffic incident region coordinate is within a predetermined radius around the mobile vehicle communication device is described. A computer readable medium is also provided including computer readable code for producing traffic incident region coordinate data, code for communicating the traffic incident region coordinate data to a mobile vehicle communication device; and code for determining when a traffic incident region coordinate is within a predetermined radius around the mobile vehicle communication device.

23 Claims, 7 Drawing Sheets

OTHER PUBLICATIONS

Trajcevski et al., Real-Time traffic udates in moving objects databases, 2002, IEEE, p. 1-5.*

Lou et al., FEC scheme for a TDM-OFDM based satellite radio broadcasting system, 2000, IEEE, p. 60-67.*

Rothblatt, The first GPS satellite radio optimized for automatic vehicle location, 1992, IEEE, p. 524-527.*

Akunets et al., Unit for retransmission of satellite radio navigation signals, 1999, IEEE, p. 168-169.*

* cited by examiner

SATELLITE RADIO REAL TIME TRAFFIC UPDATES

FIELD OF THE INVENTION

The invention relates to management of data transmission over a wireless communication system. More specifically, the invention relates to a method and system for providing real-time traffic updates to a mobile vehicle.

BACKGROUND OF THE INVENTION

Many passenger vehicles now incorporate an integrated communication system. A Vehicle Communication Unit (VCU) used in conjunction with a Wide Area Network (WAN) such as a cellular telephone network or a satellite communication system allows for a variety of fee-based subscription services to be provided in a mobile environment. The VCU is typically a mobile vehicle communication device including a cellular radio, satellite transceiver and global positioning capabilities. Communication through a carrier service may be initiated at the VCU at turn-on or through manual or voice command phone number entry. A radio communication link is established between the VCU and a Wide Area Network (WAN) using a node of the WAN in the vicinity of the VCU.

In cellular telephone systems, a node is commonly referred to as a "cellular base station." Once the radio communication link between the VCU and the cellular base station has been established, the base station then utilizes a combination of additional cellular base stations, land line networks, and possibly satellite systems to connect the VCU to the dialed telephone number.

Some VCU devices additionally incorporate a satellite radio receiver for receiving data such as global positioning system (GPS) location data, digital radio broadcasts and other data for various subscription services. A satellite transceiver system implemented in a VCU usually has a limited data throughput, but in practice is typically used just for receiving data from a central server, rather than for a two-way communication. A satellite radio broadcast may provide the same data simultaneously to many clients for a subscription service in a much more efficient manner than a cellular network, for example. However, the maximum bandwidth of a satellite system limits the amount of data that may be broadcast to a vehicle in real-time and still be processed without compromises in system response times.

In many urban regions where subscribers of fee-based services reside, there are significant traffic incidents. In many cities, the only traffic information available is provided by a traffic-news radio station broadcast, often delivered live from a helicopter-based reporter. However, some large metropolitan municipalities have installed electronic monitoring devices in roadbeds and near roadways to track traffic density and other traffic congestion metrics, although such electronic monitoring systems are usually not able to provide other real-time traffic information such as accident and stalled vehicle location reports. Radio reports may be infrequent or may not concern the section of city or roadway where a driver is actually driving, preventing practical real-time traffic updates for many commuters. It would be desirable, therefore, to provide a method and system for real-time traffic updates to a vehicle that would overcome these and other disadvantages.

SUMMARY OF THE INVENTION

The present invention is directed to a method for providing real-time traffic updates to a mobile vehicle communication device that includes producing traffic incident region coordinate data, communicating the traffic incident region coordinate data to a mobile vehicle communication device, and determining when a traffic incident region coordinate is within a predetermined radius around the mobile vehicle communication device.

In accordance with another aspect of the invention, a system for providing real-time traffic updates to a mobile vehicle communication device includes means for producing traffic incident region coordinate data, means for communicating the traffic incident region coordinate data to a mobile vehicle communication device, and means for determining when a traffic incident region coordinate is within a predetermined radius around the mobile vehicle communication device.

In accordance with yet another aspect of the invention, a computer readable medium is provided. Computer readable code is provided for producing traffic incident region coordinate data, for communicating the traffic incident region coordinate data to a mobile vehicle communication device; and for determining when a traffic incident region coordinate is within a predetermined radius around the mobile vehicle communication device.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENT

Figure 1:
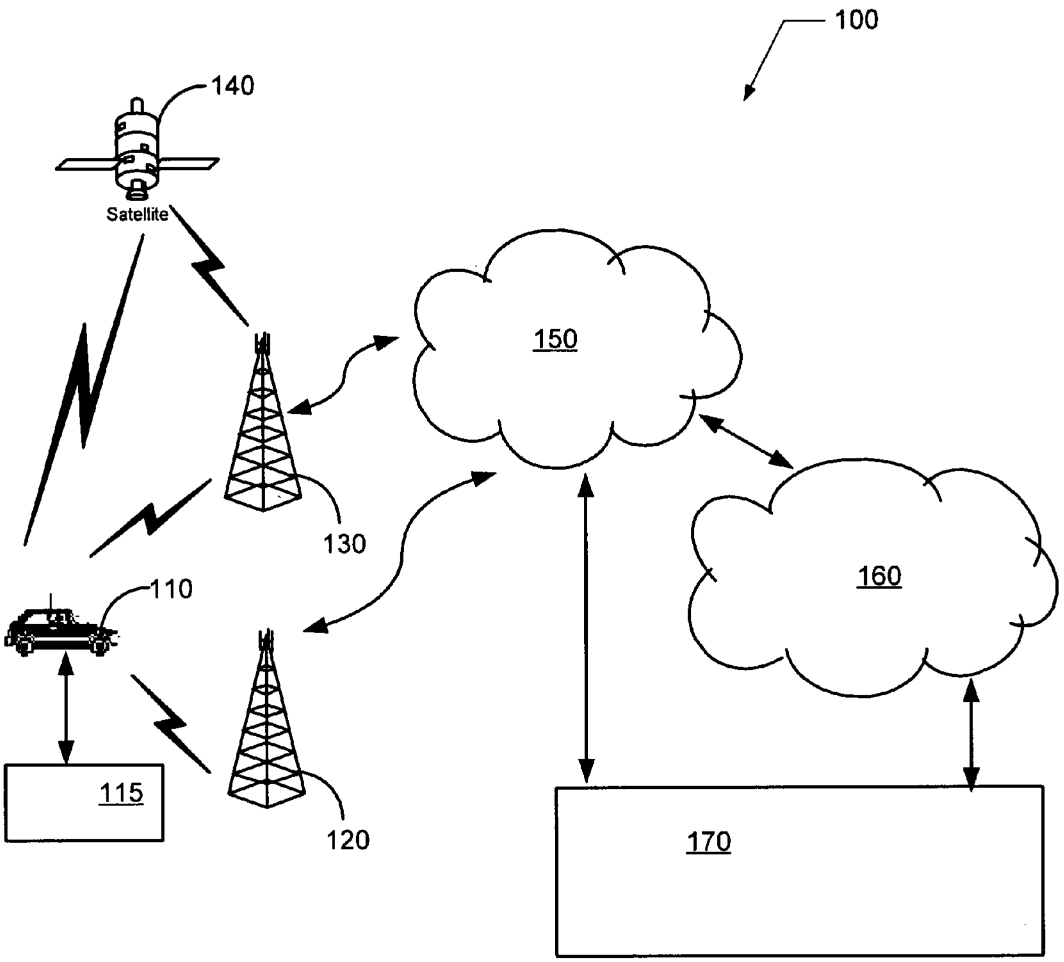
FIG. 1 is a block diagram of an exemplary operating environment according to an embodiment of the invention.

FIG. 1 is a block diagram of an exemplary operating environment according to an embodiment of the present invention. FIG. 1 shows an embodiment of a system for operating a satellite radio subscription service and a wireless communication service in a mobile vehicle, in accordance with the present invention, and may be referred to as a mobile vehicle communication system (MVCS) 100. The mobile vehicle communication system 100 includes one or more mobile vehicle communication units (MVCU) 110, one or more audio devices 115, one or more wireless communication systems 120, one or more radio carrier systems 130, one or more satellite broadcast systems 140, one or more communication networks 150, one or more land networks 160, and one or more service providers 170.

In one example, MVCS 100 is implemented as an OnStar® system, as is known in the art, and is available from the OnStar division of General Motors Corporation based in Detroit, Mich., with regard to wireless communications, and as an XM Satellite Radio® system, as is known in that art, and is available from XM Satellite Radio, Inc., based in Washington, D.C. with regard to satellite radio and terrestrial digital radio communications.

MVCU 110 includes a wireless vehicle communication device (module, MVCS module) such as an analog or digital phone with suitable hardware and software for transmitting and receiving data communications. In one embodiment, MVCU 110 further includes a wireless modem for transmitting and receiving data. In another embodiment, MVCU 110 includes a digital signal processor with software and additional hardware to enable communications with the mobile vehicle and to perform other routine and requested services.

In yet another embodiment, MVCU 110 includes a global positioning system (GPS) unit capable of determining synchronized time and a geophysical location of the mobile vehicle. In operation, MVCU 110 sends to and receives radio transmissions from wireless communication system 120. MVCU 110 may also be referred to as a mobile vehicle communication device throughout the discussion below.

Audio device 115 includes hardware suitable for receiving broadcast signals within MVCU 110. In one embodiment, audio device 115 includes a receiver and receives broadcasts from wireless communication system 120, radio broadcast system 130, and satellite broadcast system 140.

In another embodiment, audio device 115 further includes a medium for storing programming information. In an example, the programming information includes customer requested programs supplied by one or more providers including various formats. Formatted programs may include "Talk Radio," various music genres, targeted regional information, and the like. In another example, the customer requested programs are provided in the form of packages and referred to as a satellite radio program subscription (SRPS).

In yet another embodiment, audio device 115 further includes an audio speaker, a synthesized voice output, an audio channel, or the like. In one example, audio device 115 includes headphones, a television receiver, and a display device.

In another embodiment, MVCU 110 includes a speech recognition system (ASR) module capable of communicating with audio device 115. In yet another embodiment, the module is capable of functioning as any part of or all of the above communication devices and, for another embodiment of the invention, may be capable of data storage, data retrieval, and receiving, processing, and transmitting data queries. In one example, audio device 115 includes a speech recognition system (ASR) module.

Wireless communications system 120 is a wireless communications carrier or a mobile telephone system and transmits to and receives signals from one or more MVCU 110. Wireless communication system 120 incorporates any type of telecommunications in which electromagnetic waves carry signal over part of or the entire communication path. In one embodiment, wireless communication system 120 is implemented as any type of broadcast communication in addition to those of radio broadcast system 130 and satellite broadcast system 140. In another embodiment, wireless communications system 120 is implemented as a single unit in conjunction with radio broadcast system 130. In another embodiment, wireless communications system 120 is implemented via coupling with radio broadcast system 130, or in some such other configuration as would allow the systems to function as described.

In one example, such wireless communication carrier is a short message service, modeled after established protocols such as IS-637 SMS standards, IS-136 air interface standards for SMS, and GSM 03.40 and 09.02 standards. Similar to paging, an SMS communication could be broadcast to a number of regional recipients. In another example, the carrier uses services compliant with other standards, such as, for example, 802.11 compliant systems and Bluetooth systems.

In another example, the mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications.

Radio broadcast system 130 transmits radio signals with data to audio device 115 within MVCU 110. In one embodiment, radio broadcast system 130 transmits analog audio and/or video signals. In an example, radio broadcast system 130 transmits analog audio and/or video signals such as those sent from AM and FM radio stations and transmitters, or digital audio signals in the S band (approved for use in the U.S.) and L band (used in Europe and Canada).

In another embodiment, audio device 115 stores or retrieves data and information from the audio and/or video signals of radio broadcast system 130. In an example, audio device 115 retrieves terrestrial digital radio signals from a signal received from radio broadcast system 130.

Satellite broadcast system 140 transmits radio signals to audio device 115 within MVCU 110. In one embodiment, satellite broadcast system 140 may broadcast over a spectrum in the "S" band (2.3 GHz) that has been allocated by the U.S. Federal Communications Commission (FCC) for nationwide broadcasting of satellite-based Digital Audio Radio Service (DARS). In an example, satellite broadcast system 140 may be implemented as XM Satellite Radio®.

In operation, broadcast services provided by radio broadcast system 130 and satellite broadcast system 140 are received by audio device 115 located within MVCU 110. Broadcast services include various formatted programs based on a package subscription obtained by the user and managed by the audio device 115 and referred to above.

Communications network 150 is implemented as any suitable system or collection of systems for connecting wireless communications system 120 to at least one MVCU 110 or to a service provider 170. In one embodiment, communications network 150 includes a mobile switching center and provides services from one or more wireless communications companies.

Land network 160 connects communications network 150 to service provider 170. In one embodiment, land network 160 is implemented as a public-switched telephone network, a wired network, an optical network, a fiber network, another wireless network, or any combination thereof. In an example, land network 160 includes an Internet protocol (IP) network. In another embodiment, an MVCU 110 utilizes all or part of the wireless communications system 120, communications network 150, and land network 160.

In yet another embodiment, land network 160 connects one or more communications systems 120 to one another. In another embodiment, communication network 150 and land network 160 connect wireless communications system 120 to a communication node or service provider 170.

Service provider 170 is implemented as one or more locations where communications may be received or originate to facilitate functioning of the mobile vehicle communication system (MVCS) 100. Service provider 170 may contain any of the previously described functions.

In one embodiment, service provider 170 is implemented as a call center, as known in the art. In an example, the call center is implemented as a voice call center, providing verbal communications between an advisor in the call center and a subscriber in a mobile vehicle. In another example, the call center is implemented as a voice activated call center, providing verbal communications between an ASR unit and a subscriber in a mobile vehicle. In yet another example, the call center is implemented as a virtual call center, providing virtual communications between a virtual advisor and a user interface. In another embodiment, the call center contains any of the previously described functions.

In an example, the call center is implemented to service an OnStar® system. In another example, the call center is implemented to service an XM Satellite Radio® system. In yet another example, the call center is implemented to service one or more of the above examples, or other services.

In operation, a service provider 170 utilizes one or more portions of the aforementioned communications network to communicate subscriber requested programming to audio device 115. The subscriber requested programming may then be accessed by audio device 115 utilizing one or more radio broadcast system 130 and satellite broadcast system 140 segments. In one embodiment, a subscriber receives substantially real-time traffic incident alert data that characterizes multiple traffic incident regions having one or more traffic incidents, so that specific traffic incident data may be received for the subscriber's geographic location based on monitoring the received traffic region coordinates.

Figure 2:
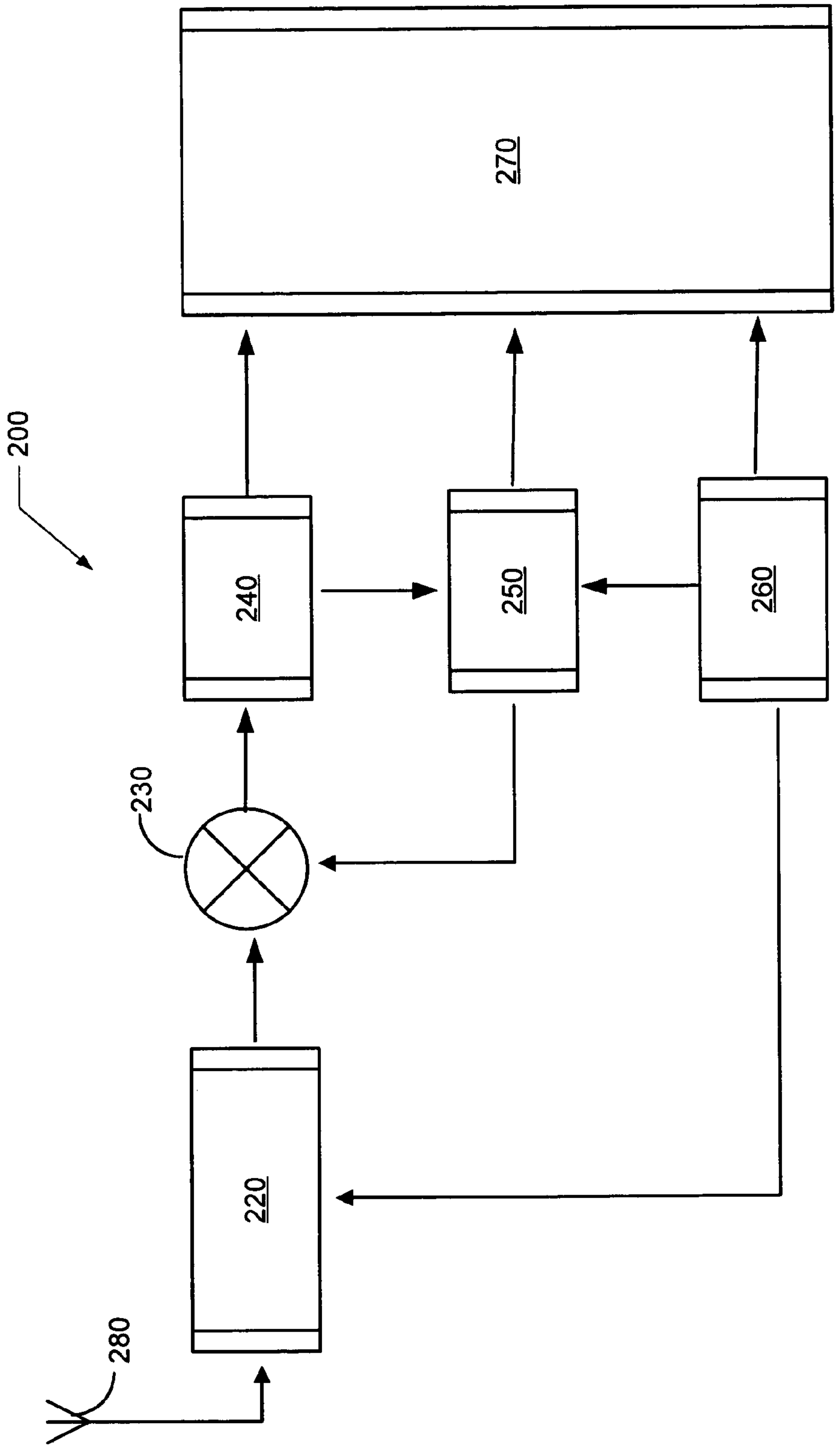
FIG. 2 is a block diagram of a global positioning system receiver which may be employed with an embodiment of the invention.

FIG. 2 is a block diagram of a global positioning system receiver which may be employed with an embodiment of the invention. FIG. 2 illustrates components utilized in receiving, decoding, and implementing a GPS signal according to one embodiment of the present invention.

In FIG. 2, GPS receiver 200 includes antenna 280, preamplifier 220, mixer 230, demodulator 240, access code generator 250, clock 260, and receiver processing unit 270. In one embodiment, GPS receiver 200 is implemented as part of MCVS 100 described in FIG. 1 above. In another embodiment, GPS receiver 200 is implemented in conjunction with a server system discussed in reference to FIG. 4.

In FIG. 2, antenna 280 is coupled to preamplifier 220. Preamplifier 220 is further coupled to mixer 230 and clock 260. Mixer 230 is further coupled to demodulator 240 and access code generator 250. Demodulator 240 is further coupled to access code generator 250 and receiver processing unit 270. Access code generator 250 is further coupled to clock 260 and receiver processing unit 270. Clock 260 is further coupled to receiver processing unit 270.

Antenna 280 is a GPS signal reception device suitable for receiving a GPS signal, as is known in the art. In one embodiment, the antenna 280 utilized is designed to receive a 1.5 GHz signal. Preamplifier 220 is a hardware component that receives the GPS signal from antenna 280 and a clock signal from clock 260. Preamplifier 220 amplifies and converts the received GPS signal to a frequency and magnitude suitable for sampling. Preamplifier 220 may be implemented as any suitable preamplifier/converter component, as is known in the art.

Mixer 230 is a hardware component that receives the amplified/converted signal from preamplifier 220 and a civilian access code measurement from access code generator 250. Mixer 230 provides a reference frequency utilized by GPS receiver 200 to correlate the transmitted signal. In one embodiment, mixer 230 provides a Doppler Frequency Measurement (DFM). Mixer 230 may be implemented as any suitable mixing component, as known in the art.

Demodulator 240 is a hardware component that receives the reference signal produced by mixer 230 and produces a navigation message and a code control message. Demodulator 240 transmits the navigation message to receiver processing unit 270 and further transmits the code control message to access code generator 250. Demodulator 240 may be implemented as any suitable demodulating component, as known in the art.

Access code generator 250 is a hardware component that receives the code control message from demodulator 240 and a clock signal from clock 260. Access code generator 250 generates the civilian access code measurement allowing synchronization and decoding of the received GPS signal. Access code generator 250 transmits the civilian access code measurement to mixer 230 and receiver processing unit 270. In one embodiment, access code generator 250 is implemented as a type of shift register. In one example, access code generator 250 is implemented as a linear feedback shift register (LFSR).

Clock 260 is a hardware component that produces a clock measurement, also referred to as the clock signal, utilized for synchronous timing of GPS receiver 200. Clock 260 transmits the clock signal to preamplifier 220, access code generator 250, and receiver processing unit 270. In one embodiment, clock 260 is implemented as a reference oscillator providing a timing standard with which to synchronize access code generator 250.

Receiver processing unit 270 is a hardware component capable of receiving data, analyzing the received data to determine positional location, and determining the validity of the analyzed data. Receiver processing unit 270 receives the navigation message from demodulator 240, the access code measurement from access code generator 250, and the clock measurement from clock 260. Receiver processing unit 270 produces location information such as position, velocity, and the like, based on the received data.

In one embodiment, receiver processing unit 270 determines data bit alignment, data parity, and data decoding based on data received from demodulator 240. In another embodiment, receiver processing unit 270 performs other determinations, such as, for example, satellite positions which may include raw measurement data, pseudo range correction which may include a satellite identifier utilized in conjunction with a lookup table/almanac, pseudo range, receiver position, velocity, and time computations based on data received from demodulator 240, access code generator 250, and clock 260.

In yet another embodiment, receiver processing unit 270 produces a combination of the above described determinations based on defined program parameters. In one embodiment, such defined program parameters are determined by a manufacturer based on a service provider's determined needs.

Receiver processing unit 270 is additionally designed to store invalid data matching specified parameters, for transmitting to service provider 170 upon request. In one embodiment, receiver processing unit 270 is implemented as part of a central processing unit. In another embodiment, receiver processing unit 270 is implemented as a separate processing unit.

Figure 3:
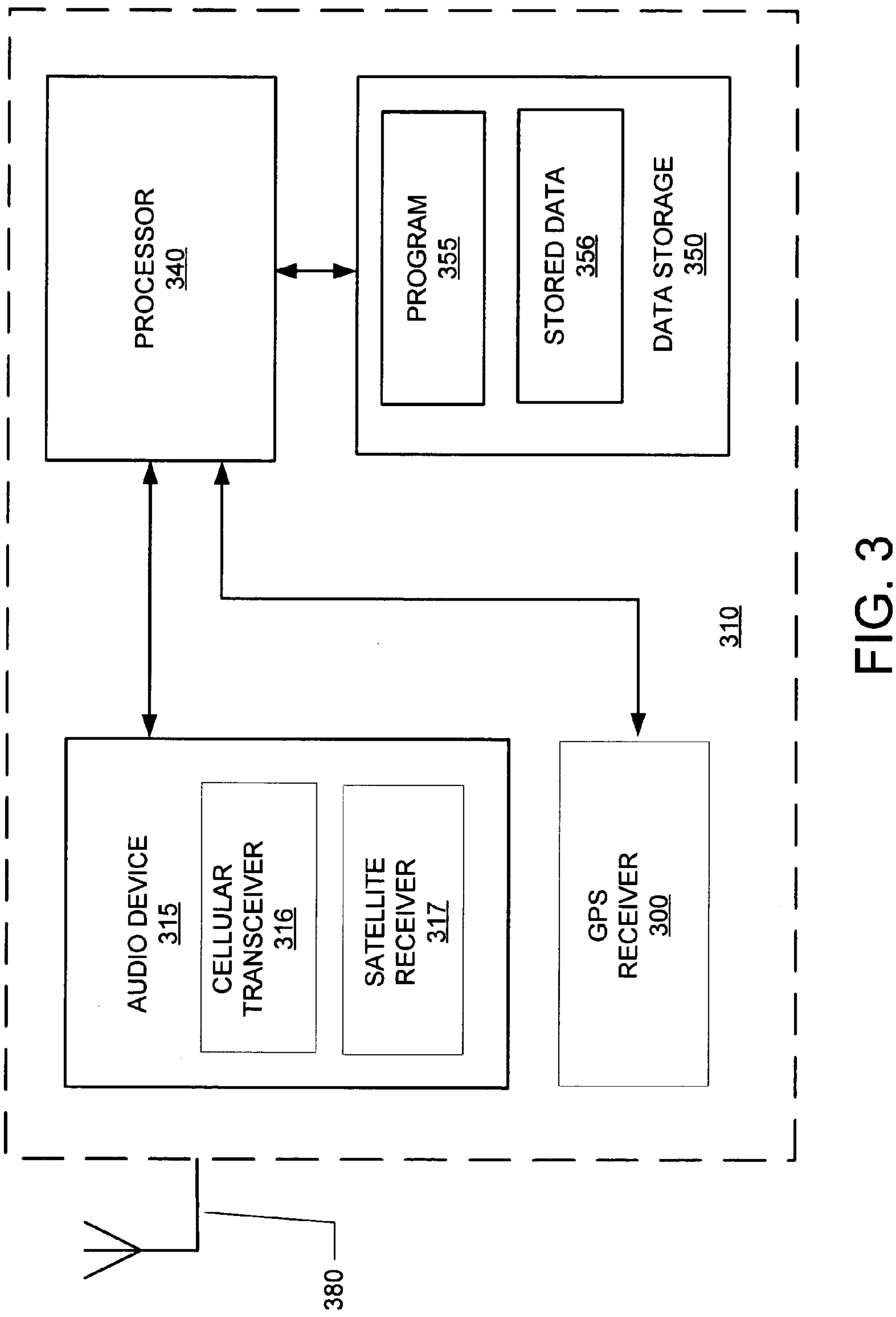
FIG. 3 is a block diagram of a mobile vehicle communication device which may be employed with an embodiment of the invention.

FIG. 3 is a block diagram of a mobile vehicle communication device which may be employed with an embodiment of the invention. FIG. 3 shows an MVCU 310 comprising an audio device 315, a GPS receiver 300, a processor 340 and data storage 350. The audio device is shown further comprising a cellular transceiver 316 and a satellite receiver 317. The data storage is shown further comprising a program 355 and stored data 356. The audio device 315, the data storage 350 and the GPS receiver 320 are shown operationally coupled to the processor 340. An antenna 380 is further shown coupled to the MVCU 310. MVCU 310 may comprise additional components (not shown) that are not relevant for an understanding of the present invention.

The audio device 315 is any audio device that provides communication functions as described in reference to audio device 115 of FIG. 1. In the present embodiment, audio device 315 is enabled to receive satellite radio broadcasts from a satellite transmitter such as satellite broadcast system 140 through satellite receiver 317 and for cellular radio communication through cellular transceiver 316.

The GPS receiver 300 is any GPS device that provides global positioning data. In one embodiment, GPS system 300 is a device as described in reference to GPS receiver 200 of FIG. 2.

The processor 340 is any processor, microcontroller or combination of processors and microcontrollers that are enabled to communicate data between components, execute computer programs instructions, and provide command and control functions for audio device 315. The processor 340 may comprise additional components (not shown) such as input-output ports, volatile or non-volatile memory and software modules.

The data storage 350 is any device for storing data, such as a disk drive, non-volatile memory and the like. Data storage 350 provides a database of stored data 356 for various types of data received to audio device 315 and GPS receiver 300. Data storage 350 also provides storage for software modules such as program 355. In one embodiment, program 355 is a program to monitor GPS traffic incident region GPS coordinate data received through GPS receiver 300 from a service provider, and initiate a communication to the service provider requesting localized traffic incident data, when a traffic incident region GPS coordinate is received that is within a predetermined radial distance from the MVCU 310. In another embodiment, MVCU 310 is coupled to a display device, a speaker system or both, and is enabled to provide received localized traffic incident data to a user in an audio or audiovisual format.

Figure 4:
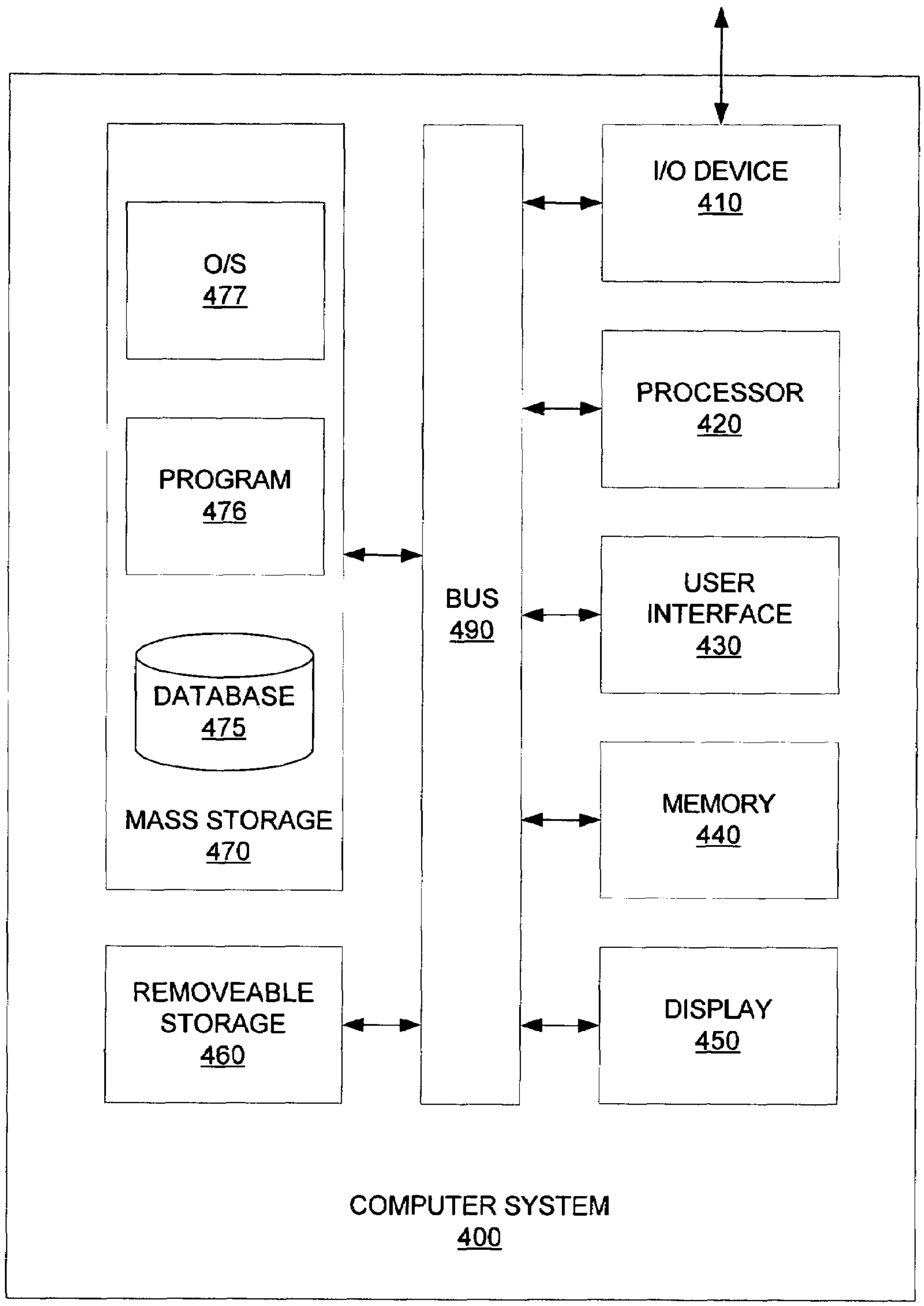
FIG. 4 is a block diagram of a server system for producing traffic region coordinate points in an embodiment of the invention.

FIG. 4 is a block diagram of an exemplary computer system for producing traffic region coordinate points in an embodiment of the invention. FIG. 4 shows a computer system 400 comprising an I/O device 410, a processor 420, a user interface 430, memory 440, a display 450, removable storage 460, a bus 490, and mass storage 470 comprising a database 475, programs 476 and an operating system 477. In FIG. 4 the I/O device 410, the processor 420, the user interface 430, the memory 440, the display 450, the removable storage 460 and the mass storage 470 are all shown coupled to the bus 490. The I/O device 410 is additionally shown enabled for communication external to computer system 400. In one embodiment, computer system 400 is a server computer utilized by a service provider to compile and manage real-time traffic incident data for very large geographical areas that is broadcast via a satellite broadcast system 140 to traffic incident alert service subscribers.

The I/O device 410 is a device capable of bidirectional data communication with a device external to the computer system 400. Examples of I/O devices include serial, parallel, USB, Ethernet and IEEE 802.11 compliant wireless devices, for example. In one embodiment (not shown) a GPS receiver is coupled to the I/O device 410 for receiving global positioning data, or for determining GPS coordinates based on traffic incident data.

The processor 420 is a computing device having memory and data control capability, such as caching and the like. The processor 420 may be integrated with supporting hardware such a video controller, a storage device controller and the like. Processor 420 executes instructions of a computer program such as program 476, for example.

The user interface 430 is a device such as a keyboard, a mouse, a pointing device, a pen, a microphone or another device used to provide a data entry interface with a user of the computer system 400.

The memory 440 is a hardware or virtual storage for computer code and data that the processor is manipulating. Memory 440 includes all dynamic memory external to the processor including video memory, additional cache memory and the like. Portions of mass storage 470 may also be used to provide virtual memory that may be used interchangeably with the memory 440.

The display 450 is a visual display such as a CRT, LCD, plasma or projection display used to provide a user with a visual interface with the computer system 400.

The removable media 460 is any device that provides a removable medium for storing computer code or data such as a magnetic disc drive, a writable optical disc drive or the equivalent.

The mass storage 470 is any device that provides storage for computer code and data such as a hard disk drive, a recordable optical medium, and the like. In one embodiment, the mass storage 470 is provided by a second computer server system over a network (not shown). The mass storage generally contains the operating system 477, programs 476 and may include a database 475. Programs include applications for execution by the computer system 400. In one embodiment (not shown), the mass storage 470 is distributed over a very large network of computer systems that are linked together.

The bus 490 is a bidirectional communication device that enabled data communication between the various devices of computer system 400. The bus may include a processor and other logic devices to enable multiple data clock speeds and protocols depending upon the connected devices.

In operation, computer system 400 runs programs such as program 476 for producing traffic incident region coordinate data to be stored in a database 475 and/or communicated to other devices through I/O device 410 such as a satellite broadcast system 140 as described in FIG. 1.

In one embodiment, one or more data entry operators enter traffic incident data into a database 475 in real-time for various geographic locations. Additional traffic incident data may be received electronically from various sources such as roadway sensors, GPS receivers 200, and various municipal and police department computer systems. Program 476 compiles received traffic incident data, processes the incident data to group traffic incidents into a plurality of traffic incident regions, and then determines a traffic incident region GPS coordinate for each of the plurality of traffic incident regions. In one embodiment, the program 476 is configured to sort the various traffic incident data and group traffic incidents into traffic incident regions of a selected geometry and size, with each region having a single GPS coordinate in order to reduce the amount of traffic incident data that must be broadcast to the MVCU 310 of a traffic incident alert service subscriber.

Figure 5:
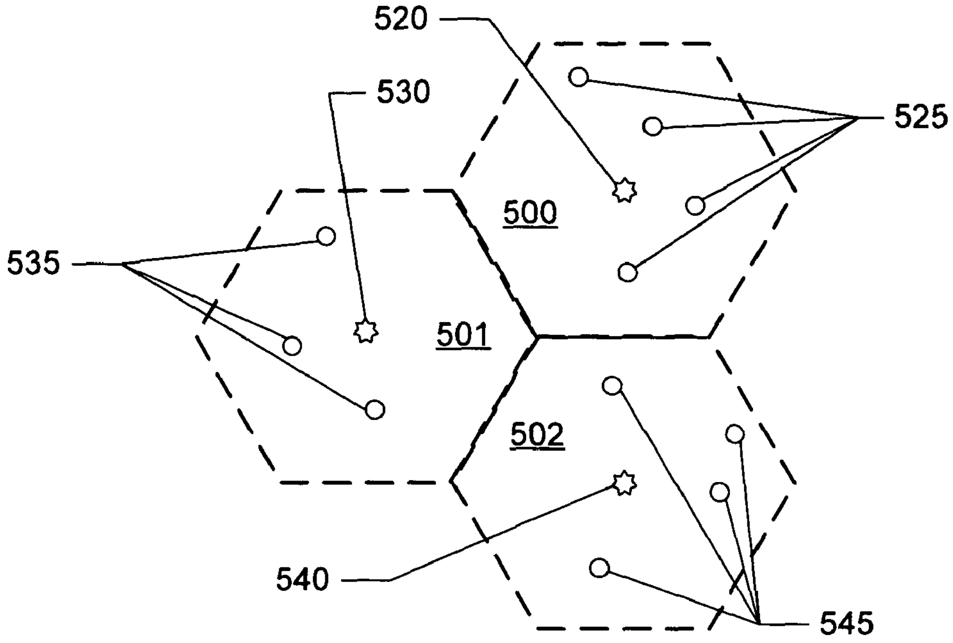
FIG. 5 is an illustration of traffic data regions in accordance with an embodiment of the present invention.

FIG. 5 is an illustration of traffic data regions in accordance with an embodiment of the present invention. FIG. 5 shows three illustrative traffic data regions 500, 501, 502. Traffic data region 500 is shown as a hexagonal region having four traffic incidents 525 and a traffic data region GPS coordinate 520. Traffic data region 501 is shown as a hexagonal region bordering region 500 and having three traffic incidents 535 and a traffic data region GPS coordinate 530. Traffic data region 502 is shown as a hexagonal region bordering both regions 500 and 501 and having four traffic incidents 545 and a traffic data region GPS coordinate 540. In one embodiment of the present invention, the traffic incident regions illustrated in FIG. 5 are the result of a traffic incident data compilation and analysis process performed using a computer program such as program 476 of FIG. 4. The traffic data regions may have any suitable shape or size.

In one embodiment, the traffic incident region geometry and size are determined through analytical and statistical methods to provide a suitable trade-off between parameters such as, but not limited to, precision of traffic incident data, bandwidth and availability of satellite broadcasting systems 140, and number of traffic incidents per-unit-time. In another embodiment, traffic incident region size and geometry are selectable and variable depending on parameters such as those recited. For example, traffic incident density in rural regions is significantly reduced compared to traffic incident density in large metropolitan regions. Scaling the size of incident regions depending on traffic incident density yields a further reduction of necessary broadcast data.

In one embodiment, traffic incident regions such as regions 500, 501, 502 are contiguous regions of approximately five square miles that together cover a large geographical region, e.g., North America. In one embodiment, overlap of traffic incident region boundaries is provided for error correction and robustness.

In operation, a traffic incident region GPS coordinate is selected to represent a traffic incident region. In one embodiment, a traffic incident region GPS coordi9nate is selected as the geometric center of a predetermined traffic incident region. In another embodiment, the traffic incident region GPS coordinate is selected using analytical processes based on the geographical location of traffic incidents within a predetermined traffic incident region. In yet another embodiment, a traffic incident region is defined based on the occurrence and location of traffic incidents within a predetermined or analytically determined proximity of each other. In yet another embodiment, a two dimensional iterative regression analysis provides a GPS coordinate representative of several traffic incidents that defines a traffic incident region. Selecting a single GPS coordinate to represent several traffic incidents within a region greatly reduces the amount of data that must be transferred to a traffic incident alert subscriber MVCU. When a traffic incident region GPS coordinate occurs within a predetermined "forward view" radius of the MVCU additional localized traffic incident data is requested.

Figure 6:
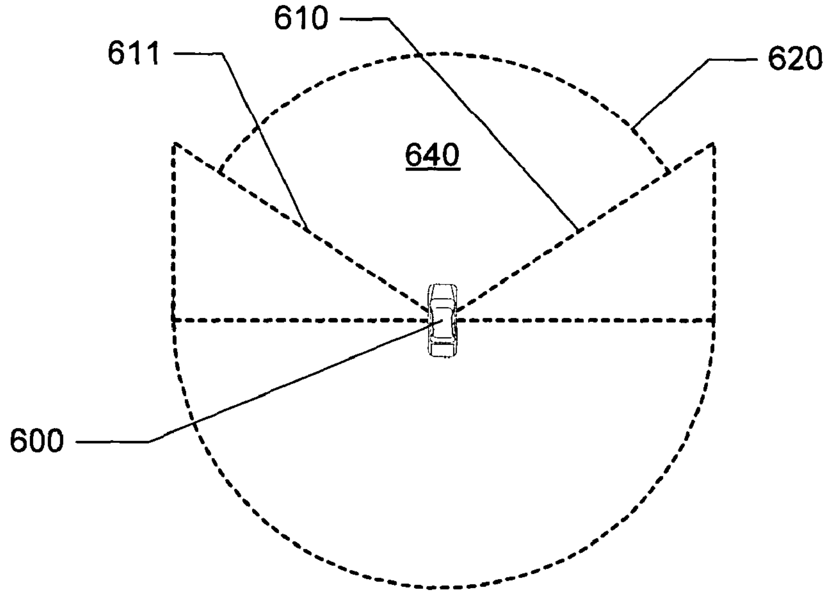
FIG. 6 is an illustration of a forward view radius in accordance with an embodiment of the present invention.

FIG. 6 is an illustration of a forward view radius in accordance with an embodiment of the present invention. FIG. 6 shows a vehicle 600 having a "forward view radius" 640 defined by a sector of a circle 620 with a radius centered at vehicle 600 as determined by a GPS receiver 200, and having sector angles defined by the angle of the forward view which is represented by two right triangles 610 and 611 perpendicular to the vehicle 600. In one embodiment, the radial distance from the vehicle 600 that defines the "forward view radius" 640 is approximately 10 miles. In another embodiment, the radial distance from the vehicle 600 that defines the "forward view radius" 640 is controlled by a user of the system and may be set to any appropriate size as desired by the user. For example, in an embodiment using a user controlled forward view radius, one user may prefer a relatively small forward view radius and another user may prefer a relatively large forward view radius. In another embodiment, the radial distance from the vehicle 600 that defines the "forward view radius" 640 is dynamically controlled depending on factors that comprise road density, traffic density, population density, user preferences and other factors that are relevant to real time traffic updates. In yet another embodiment, the radial distance from the vehicle 600 that defines the "forward view radius" 640 is controlled by road density. In one embodiment that controls the forward view radius, the forward view radius is shorter in an area with relatively high road density and the forward view radius is relatively longer in an area with relatively low road density. In another embodiment, the vehicle 600 incorporates a GPS unit 200 as described in FIG. 2, and an MVCU 310 as described in FIG. 3.

In operation, when a traffic incident region GPS coordinate 520 is determined to be within the forward view radius 640 around the mobile vehicle communication unit based on the communicated traffic incident region coordinate data 520, communication to a service provider is initiated requesting localized traffic incident data 525 for the traffic incident region to provide to a user.

Figure 7:
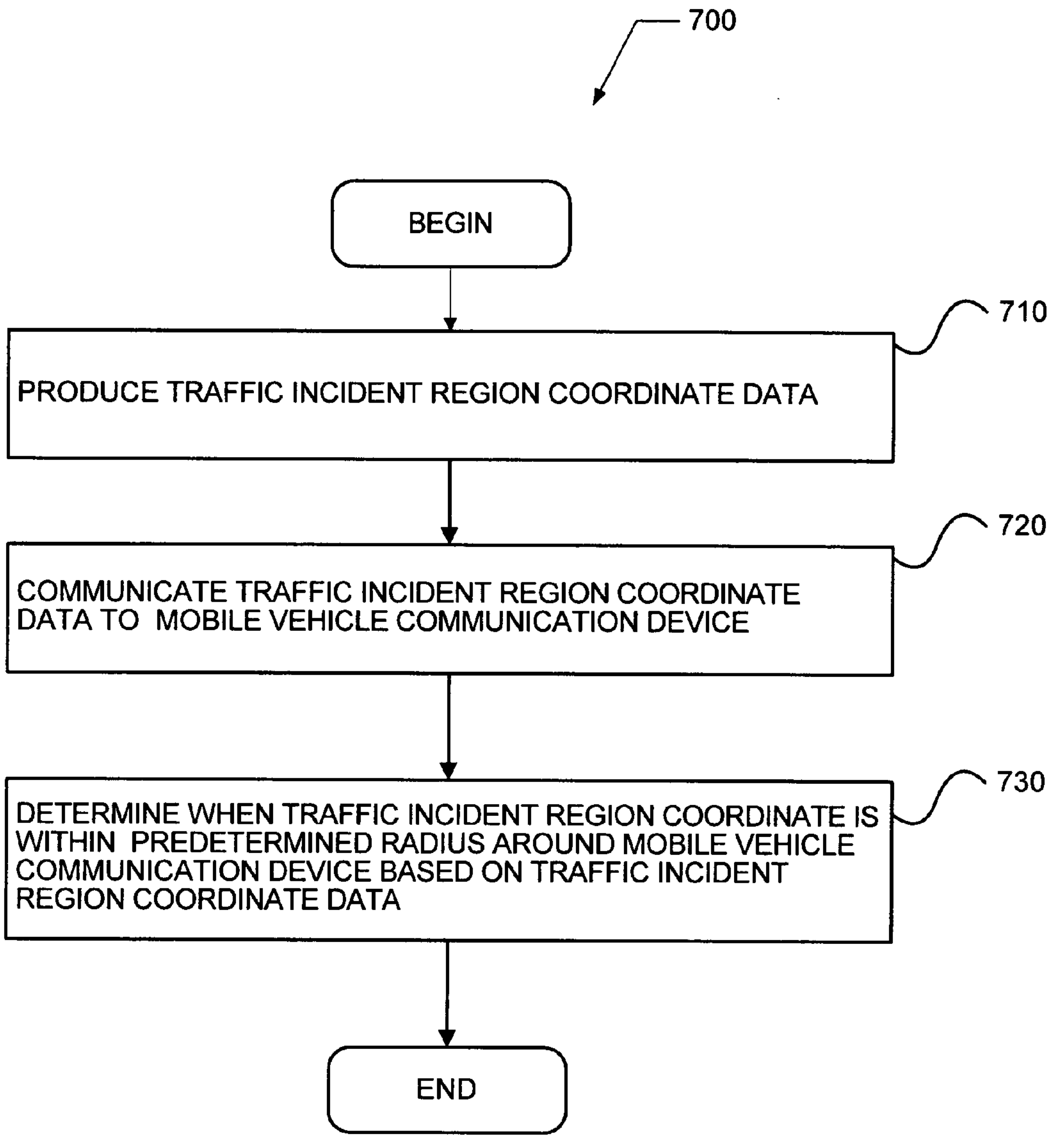
FIG. 7 is a flow diagram of a method for providing real-time traffic updates to a mobile vehicle communication device.

FIG. 7 is a flow diagram of a method for providing real-time traffic updates to a mobile vehicle communication device. Method 700 commences with step 710. In step 710, traffic incident region coordinate data is produced. Traffic incident coordinate data may be produced at any time, and may continue indefinitely, repeat at predetermined intervals or repeat upon demand. In one embodiment, traffic incident data production is a continuous process that includes receiving traffic incident data, processing the traffic incident data to group traffic incidents into a plurality of traffic incident regions, and determining a traffic incident region GPS coordinate for each of the plurality of traffic incident regions. In one embodiment, the traffic incident region GPS coordinate 520 describes the geometric center of a traffic incident region 500 containing at least one traffic incident 525. In another embodiment, the traffic incident region 500 is a geographical region of 10 square miles or less. In yet another embodiment, the traffic incident region 500 has a selectable geographical geometry based on system MVCS 100 parameters such as system bandwidth, number of active subscription service subscribers, number of traffic incidents per-unit-time and other parameters.

In operation, a computer system 400 runs a program 476 to compile traffic incident reports 525 received through a variety of data channels and sources to create a database 475 of traffic incidents. The computer system 400 produces traffic incident region coordinate data 520 to be communicated in real-time simultaneously to traffic incident alert subscribers through a satellite broadcast system 140 over a very large geographic area, e.g., North America. In one embodiment, one or more data entry operators enter traffic incident data 525 into a database 475 in real-time for various geographic locations. Additional traffic incident data 525 may be received electronically from various sources such as, but not limited to, roadway sensors, GPS receivers 200, and various municipal and police department computer systems. In one embodiment, program 476 compiles received traffic incident data 525, processes the incident data 525 to group traffic incidents into a plurality of traffic incident regions 500, 501, 502, and then determines a traffic incident region GPS coordinate 520 for each of the plurality of traffic incident regions 500, 501, 502. In one embodiment, the program 476 is configured to sort the various traffic incident data 525 and group traffic incidents into traffic incident regions 520 of a selected geometry and size, with each region having a single GPS coordinate in order to reduce the amount of traffic incident data that must be broadcast to the MVCU 110 of a traffic incident alert service subscriber. Step 710 may continue indefinitely, repeat at predetermined intervals or repeat upon demand.

In step 720, traffic incident region coordinate data is communicated to a mobile vehicle communication device 110. Traffic incident region coordinate data 520 may be communicated at any time after it is produced in step 710. In one embodiment, communicating traffic incident region coordinate data includes transmitting a traffic incident region GPS coordinate 520 for each of a plurality of traffic incident regions 500 and subsequently receiving the traffic incident region GPS coordinates 520 for each of the plurality of traffic incident regions 500 at a mobile vehicle communication device. In another embodiment, the traffic incident region coordinate data 520 is communicated through a wireless communications system 120 such as satellite broadcasting systems 140 and radio carrier systems 130, for example. Once initiated, step 720 may continue indefinitely, repeat at predetermined intervals or repeat upon demand.

Step 730 comprises determining when a traffic incident region coordinate 520 is within a predetermined radius around a mobile vehicle communication device based on the traffic incident region coordinate data 520 received in step 720. In one embodiment, step 730 is a continuous "do until" process that automatically monitors traffic incident region coordinate data 520 received to a mobile vehicle communication device until GPS coordinates 520 within a "forward view radius" 640 are identified, at which point a secondary process is invoked while the GPS coordinate monitoring continues. In one embodiment, determining when a traffic incident region coordinate 520 is within a predetermined radius 640 around a mobile vehicle communication device includes determining a location GPS coordinate describing the location of the mobile vehicle communication device, comparing the received traffic incident region GPS coordinate 520 with the location GPS coordinate describing the location of the mobile vehicle communication device, and identifying when a traffic incident region GPS coordinate 520 is within the predetermined radius 640 around the mobile vehicle communication device based on the comparison. In one embodiment, a GPS receiver 200 is utilized with an MVCS 310 in a vehicle 600 to determine a location GPS coordinate and to receive vehicle traffic incident region coordinates and to compare the location GPS coordinate with received coordinates to identify a traffic incident region GPS coordinate 520 within the predetermined forward view radius of vehicle 640.

Another embodiment further includes determining localized traffic incident data 525 for the traffic incident region coordinate 520 responsive to determining that the traffic incident region coordinate 520 is within a forward view radius 640 of the mobile vehicle communication device. In yet another embodiment, determining localized traffic incident data 525 includes initiating a communication to a service provider, requesting the localized traffic incident data 525 for the determined traffic incident region coordinate 520 from the service provider, receiving the traffic incident data 525 for the traffic incident region coordinate 520 from the service provider, and providing the localized traffic incident data 525 to a user. Localized traffic incident data 525 includes any traffic incident reports for a geographic traffic incident region 500 for which a single GPS coordinate 520 was created. In one embodiment, the localized traffic incident data 525 is provided to a display device. In another embodiment, the localized traffic data 525 is provided to an audio device such as a speaker. In yet another embodiment, localized traffic data 525 is provided by a live operator through a service provider channel, such as the OnStar® system for example. Step 730 may continue indefinitely, repeat at predetermined intervals or repeat upon demand.

Figure 8:
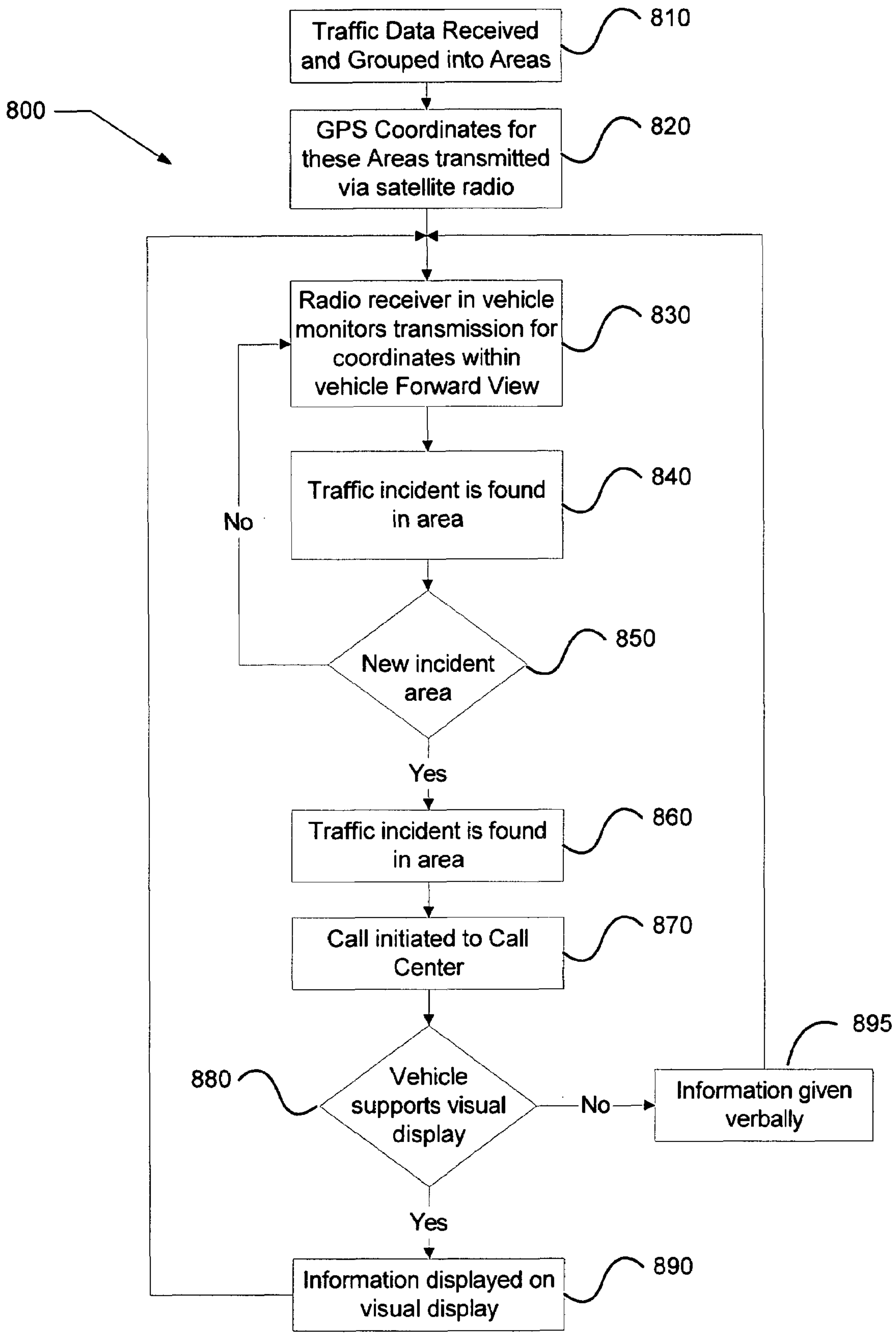
FIG. 8 is a process flow diagram in an example of the method of FIG. 7 according to an embodiment of the invention.

FIG. 8 is a process flow diagram in an example of the method of FIG. 7 according to an embodiment of the invention. Process 800 begins in step 810 with the grouping of received traffic data into "areas", or "regions" as described with reference to FIG. 7. Step 810 is a continuous process that includes receiving traffic incident data, processing the traffic incident data to group traffic incidents into a plurality of traffic incident regions, and determining a traffic incident region GPS coordinate for each of the plurality of traffic incident regions. A computer system 400 runs a program 476 to compile traffic incident reports 525 received through a variety of data channels and sources to create a database 475 of traffic incidents (traffic data). Traffic incident data 525 may be received electronically from various sources such as roadway sensors, GPS receivers, and various municipal and police department computer systems. The computer system 400 produces traffic incident region coordinate data 520 representing the areas of grouped traffic incidents in response to the received traffic incident reports.

In step 820, GPS coordinates for the traffic incident regions are transmitted through a satellite broadcast system 140 over a very large geographic area, e.g., North America, to be received at a mobile vehicle communication device 110. Once initiated, step 820 may continue indefinitely, repeat at predetermined intervals or repeat upon demand.

In step 830 a radio receiver (MVCU 110) in a vehicle monitors the satellite radio transmission of step 820 to determine when a GPS coordinate is within a "forward view" radius around the vehicle.

In step 840, the receiver determines when a received GPS coordinate is detected that describes a location within the vehicle forward view. A GPS receiver 200 is utilized with an MVCS 310 in a vehicle 600 to determine a vehicle location GPS coordinate and to receive vehicle traffic incident region coordinates and to compare the location GPS coordinate with received coordinates to identify a traffic incident region GPS coordinate 520 within the forward view radius of the vehicle 640.

In step 850, a determination is made whether a new GPS coordinate representing a new area is received. If the determination in step 850 is affirmative, process 800 continues to step 860. If the determination in step 850 is negative, then process 800 returns to step 830. In step 860, the receiver in the vehicle conflnns that a received GPS coordinate is detected within the vehicle forward view. In step 870, a wireless telephone call is placed to a service provider call center to obtain detailed traffic incident data for the area represented by the GPS coordinate received by the receiver in the vehicle. The detailed local traffic data is then provided by the service provider to the vehicle receiver during the telephone call.

In step 880, a determination is made whether the vehicle supports visual display of the local traffic data received in step 870. If the determination in step 880 is affirmative, the received local traffic data is provided to a visual display in step 890 and process 800 returns to step 830. If the determination in step 880 is negative, then the received local traffic data is provided to an audio device in step 895 and process 800 returns to step 830.

The present invention may be embodied in other specific forms without departing from its spirit or essential characteristics. The described embodiments are to be considered in all respects only as illustrative and not restrictive.

I claim:

1. A method for providing real-time traffic updates to a mobile vehicle communication device operatively disposed in a mobile vehicle, the method comprising:

grouping traffic incident data into one or more traffic data regions, each of the one or more traffic data regions defined by a respective region GPS coordinate;

receiving, at the mobile vehicle communication device from a satellite radio broadcast system, the respective region GPS coordinates;

determining that at least one of the respective received region GPS coordinates is within a predetermined area in which the mobile vehicle is located; and then requesting that a service provider, in operative communication with the mobile vehicle communication device, transmit localized traffic incident data to the mobile vehicle.

2. The method of claim 1, further comprising substantially continuously monitoring the received respective region GPS coordinates.

3. The method of claim 2 wherein, upon determining that the at least one of the respective received GPS coordinates is within the predetermined area, the method further comprises initiating, via the mobile vehicle communication device, a communication with the service provider.

4. The method of claim 1 wherein the respective region GPS coordinate is indicative of a geometric center of one of the one or more traffic data regions containing at least one traffic incident.

5. The method of claim 1 wherein the predetermined area is a circle having the mobile vehicle centrally located therein, and wherein the at least one of the respective received region GPS coordinates is located within a forward sector of the circle.

6. The method of claim 1 wherein a size of the predetermined area is controlled, and is based upon at least one of user preferences, road density, traffic density, population density, or combinations thereof.

7. The method of claim 1 wherein each of the one or more traffic data regions has a selectable geometry.

8. The method of claim 1 wherein determining that the at least one of the respective received GPS coordinates is within the predetermined area includes:

determining a location coordinate of the mobile vehicle communication device;

defining the predetermined area based on the location coordinate of the mobile vehicle communication device;

comparing the at least one of the respective received region GPS coordinates with the predetermined area; and identifying that the at least one of the respective received region GPS coordinates is within the predetermined area.

9. The method of claim 1 wherein grouping is accomplished via the service provider or the satellite radio broadcast system.

10. The method of claim 1, further comprising:

receiving the localized traffic incident data for the determined at least one of the respective received region GPS coordinates from the service provider; and providing the localized traffic incident data to a user.

11. A computer readable medium storing a computer program, comprising:

computer readable code for grouping traffic incident data into one or more traffic data regions, each of the one or more traffic data regions defined by a respective region GPS coordinate;

computer readable code for receiving, at the mobile vehicle communication device from a satellite radio broadcast system, the respective region GPS coordinates;

computer readable code for determining that at least one of the respective received region GPS coordinates is within a predetermined area in which the mobile vehicle is located; and computer readable code for requesting that a service provider, in operative communication with the mobile vehicle communication device, transmit localized traffic incident data to the mobile vehicle.

12. The computer readable medium of claim 11, further comprising computer readable code for substantially continuously monitoring the received respective region GPS coordinates.

13. The computer readable medium of claim 11 wherein the computer readable code for grouping the traffic incident data comprises code for determining a geometric center of one of the one or more traffic data regions containing at least one traffic incident.

14. The computer readable medium of claim 11 wherein the computer readable code for determining that at least one of the respective received GPS coordinates is within the predetemiined area includes:

computer readable code for determining a location coordinate of the mobile vehicle communication device;

computer readable code for defining the predetermined area based on the location coordinate of the mobile vehicle communication device;

computer readable code for comparing the at least one of the respective received region GPS coordinates with the predetermined area; and computer readable code for identifying that the at least one of the respective received region GPS coordinates is within the predetermined area.

15. The computer readable medium of claim 11, further comprising:

computer readable code for initiating a communication with the service provider;

computer readable code for receiving the localized traffic incident data from the service provider; and computer readable code for providing the localized traffic incident data to a user.

16. A system for providing real-time traffic updates to a mobile vehicle communication device operatively disposed in a mobile vehicle, the method comprising:

means for grouping traffic incident data into one or more traffic data regions, each of the one or more traffic data regions defined by a respective region GPS coordinate;

means for receiving, at the mobile vehicle communication device from a satellite radio broadcast system, the respective region GPS coordinates;

means for determining that at least one of the respective received region GPS coordinates is within a predetermined area in which the mobile vehicle is located; and means for requesting that a service provider, in operative communication with the mobile vehicle communication device, transmit localized traffic incident data to the mobile vehicle.

17. The system of claim 16, further comprising means for substantially continuously monitoring the received respective region GPS coordinates.

18. The system of claim 16, further comprising means for initiating, via the mobile vehicle communication device, a communication with the service provider.

19. The system of claim 16 wherein the means for determining that the at least one of the respective received region GPS coordinates is within the predetermined area comprises:

means for determining a location GPS coordinate describing a location of the mobile vehicle communication device;

means for defining the predetermined area based on the location of the mobile vehicle communication device;

means for comparing the at least one of the respective received region GPS coordinates with the predetermined area; and means for identifying that the at least one of the respective received region GPS coordinates is within the predetermined area based on the comparison.

20. The system of claim 16 wherein the grouping means is located at the service provider or the satellite radio broadcast system.

21. A method of receiving traffic incident data at a mobile vehicle communication device in a mobile vehicle, the method comprising:

grouping traffic incident data into a plurality of data regions, each of the plurality defined by a respective region GPS coordinate;

receiving the respective region GPS coordinates via a satellite radio broadcast system at the mobile vehicle communication device;

monitoring the received respective GPS coordinates for a coordinate that is within a predetermined area defined by a forward sector of a circle having the vehicle located substantially centrally therein;

initiating a communication with a call center from the mobile vehicle communication device upon determining that the coordinate is within the predetermined area;

requesting localized traffic incident data from the call center; and receiving the localized traffic incident data from the call center.

22. The method of claim 21, further comprising:

determining that the mobile vehicle supports a visual display; and visually displaying the localized traffic incident data on the visual display.

23. The method of claim 21 wherein the at least one received region GPS coordinate describes a center of a traffic incident region containing at least one traffic incident.

* * * * *